Dec. 18, 1956 R. B. STEWART ET AL 2,774,365
WITHDRAWAL OR VENTING SYSTEM FOR
TANKS CONTAINING LIQUIDS
Filed May 20, 1954 2 Sheets-Sheet 1

INVENTORS
RONALD B. STEWART
R. G. DENNYS
BY
Maybee & Legris
ATTORNEYS

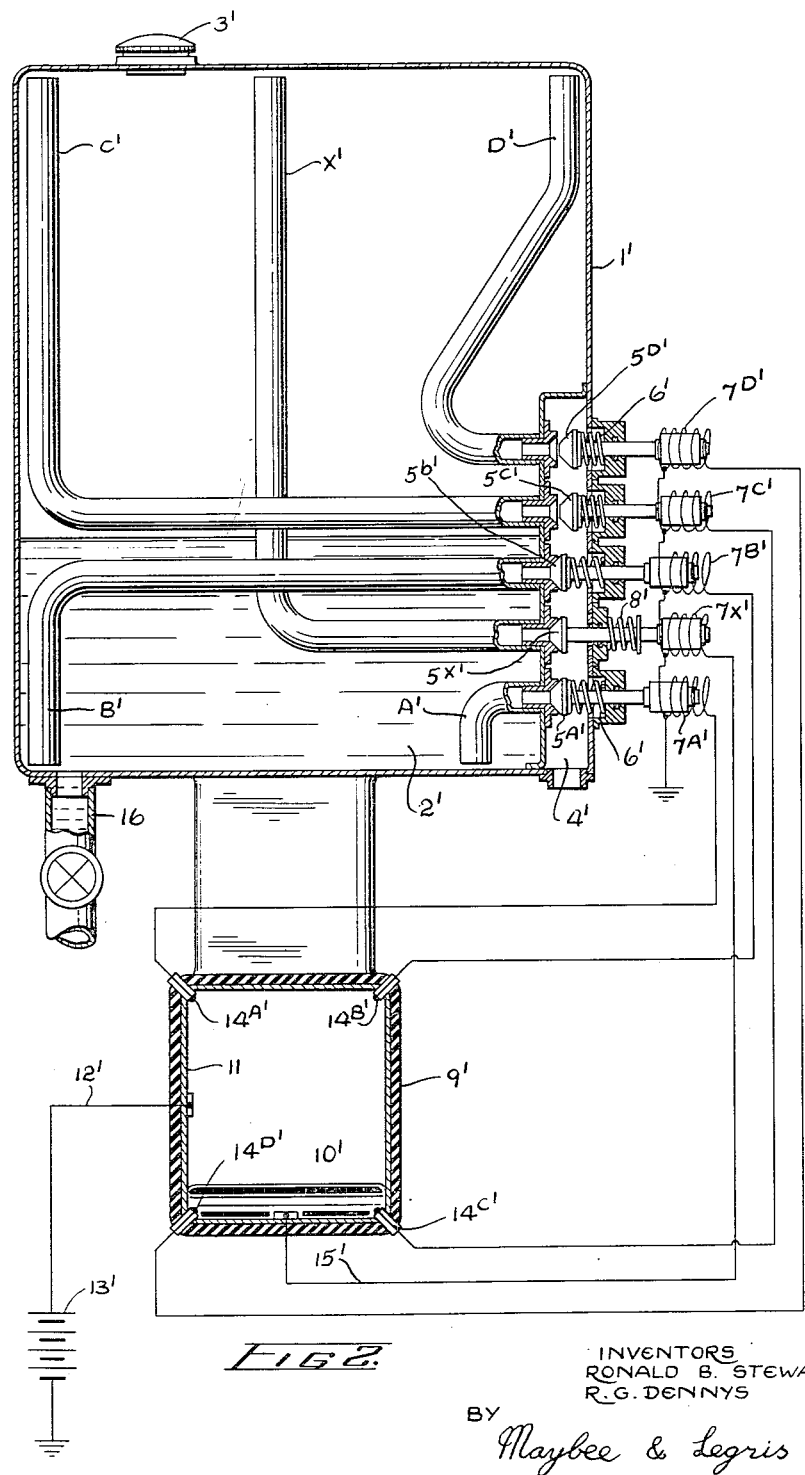

United States Patent Office 2,774,365
Patented Dec. 18, 1956

2,774,365

WITHDRAWAL OR VENTING SYSTEM FOR TANKS CONTAINING LIQUIDS

Ronald Bryson Stewart, York Township, York County, Ontario, and Ronald Greville Dennys, Brampton, Ontario, Canada, assignors to A. V. Roe Canada Limited, Peel, Ontario, Canada, a corporation Application May 20, 1954, Serial No. 431,247

7 Claims. (Cl. 137—44)

This invention relates to systems for withdrawing liquid from tanks or for venting tanks containing liquid, and in particular the invention relates to systems for lubricating oil tanks or fuel tanks of aircraft.

Fuel and oil tanks for aircraft have heretofore been constructed with mechanical devices, usually actuated by gravity, for delivering fuel or oil from the tank when the aircraft is not in level flight, or is inverted, or is otherwise subjected to "g" forces, but the various means so far devised have suffered from impositive action, susceptibility to sticking, difficulties in inspecting and servicing, and inability to fail safe.

It is the object of the invention to provide a fuel or oil withdrawal system of superior, simple construction free from the difficulties that have heretofore been experienced, such system being readily adaptable for venting tanks.

Two embodiments of the invention are shown schematically in the accompanying drawings in which:

Fig. 2 is a similar view of a venting system.

Figure 1:
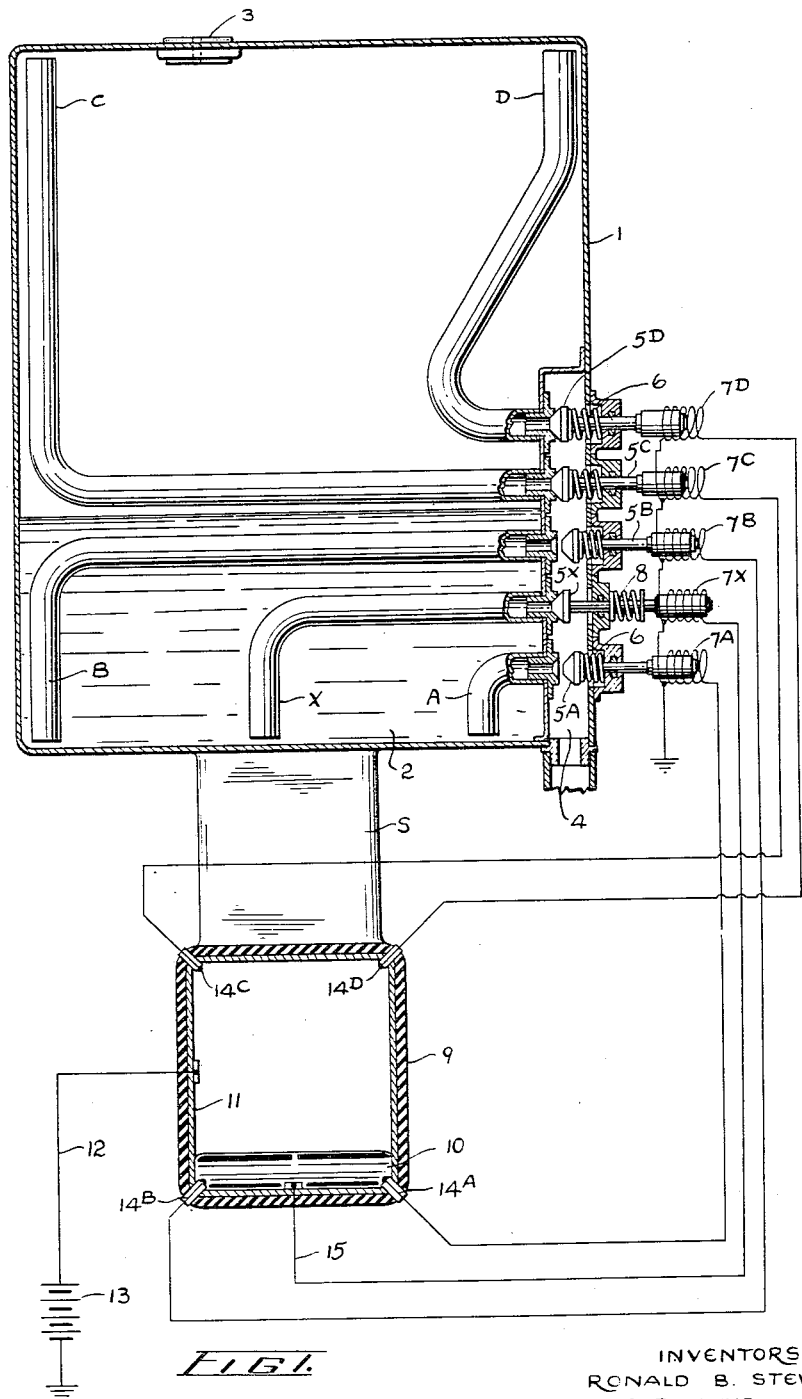
Fig. 1 is a largely sectional view of a withdrawal system.

Referring to Fig. 1, a tank 1 contains fuel 2 and has a fuel inlet and air vent 3 and an outlet manifold 4. Leading to the outlet manifold from four widely separated points in the tank are four outlet pipes A, B, C and D, and leading to the manifold from near the middle of the bottom of the tank is a fifth outlet pipe X. At the manifold, the pipes A, B, C and D have valves 5A, 5B, 5C and 5D respectively, these valves being normally held closed by springs 6. Solenoids 7A, 7B, 7C and 7D are provided for opening the valves 5A, 5B, 5C and 5D respectively, as will presently be described. At the manifold, the pipe X has a valve 5X which is urged towards open position by a spring 8, but which has a solenoid 7X for holding it closed.

A second tank 9 of similar shape to the tank 1 is mounted in fixed relationship to the tank 1, as indicated diagrammatically by a connecting strut S, so that if an aircraft in which the tanks are mounted should be flying upside down both tanks would be inverted. The tank 9 is partially filled with mercury 10, which always lies in a part of tank 9 similar to the part of tank 1 that is occupied by fuel 2. The tank 9 has an electrically conductive inner wall 11 connected by a wire 12 to one side of a voltage source 13, the other side of the source being grounded. Thus the mercury 10 is always at the potential of the one side of the source, no matter what the position of the tank 9 relative to the earth. Within the tank 9, and insulated therefrom, are four electrical terminals 14A, 14B, 14C and 14D, these being at similar locations in the tank 9 to the locations of the inlets of the pipes A, B, C and D respectively in the tank 1. The terminals 14A, 14B, 14C and 14D are connected to one side of the solenoids 7A, 7B, 7C and 7D respectively, the other side of each solenoid being grounded. Thus, with the tanks in the normal, upright position illustrated, the solenoids 7A and 7B are energized from source 13 through wire 12, wall 11, mercury 10 and terminals 14A and 14B, and consequently the valves 5A and 5B are held open against the force of their springs 6, so that fuel may be withdrawn from the bottom of the tank 1 through the outlet pipes A and B. If the tanks are moved clockwise, the fuel in tank 1 runs away from outlet B and towards outlet D, and the mercury in tank 9 similarly runs out of contact with terminal 14B and into contact with terminal 14D, de-energizing solenoid 7B and energizing solenoid 7D, thus causing valve 5B to close and valve 5D to open for the withdrawal of fuel from pipe D.

One side of solenoid 7X is electrically connected by a wire 15 to the conductive wall 11, and the other side of solenoid 7X is grounded. As long as the source 13 is operative, the solenoid 7X is energized through wire 12, wall 11 and wire 15 and consequently valve 5X is closed. If, however, the voltage source fails, solenoid 7X is de-energized and valve 5X opens, permitting withdrawal of fuel through outlet pipe X. Valve 5X is thus a safety valve which opens in case of power failure, and is required, in the embodiment illustrated in the drawing, since the other valves 5A, 5B, 5C and 5D close when voltage is not supplied to their solenoids.

It will be seen that the movement of the mercury in the tank 9 accurately follows the movement of the fuel in the tank 1 and ensures opening of outlets in the tank 1 at the portions of tank 1 that are occupied by fuel. The mercury will never stick in the manner of mechanical valve controls, and the solenoid-controlled valves are highly dependable. The solenoids and valves are located where they may readily be inspected or changed.

Now referring to Fig. 2, a fuel tank 1' containing fuel 2' has a fuel inlet 3', a fuel outlet 16, four vent pipes A', B', C', D' leading from different parts of the tank to a manifold 4', and another vent pipe X' leading from near the middle of the top of the tank to the manifold. At the manifold, the pipes A', B', C' and D' have valves 5A', 5B', 5C' and 5D' respectively; like the valves of Fig. 1, these valves are normally held closed by springs 6' but have solenoids 7A', 7B', 7C' and 7D' respectively for opening them. At the manifold, the pipe X' has a valve 5X' which, like the valve 5X of Fig. 1, is urged towards open position by a spring 8', but which has a solenoid 7X' for holding it closed.

A second tank 9', in fixed relationship to the tank 1', contains mercury 10', has an inner conductive wall 11' connected by a wire 12' to a voltage source 13', and has terminals 14A', 14B', 14C' and 14D' connected to the solenoids 7A', 7B', 7C' and 7D' respectively but it is to be noted that the terminals 14A', 14B', 14C' and 14D' of Fig. 2 are in diagonally opposite corners to the terminals 14A, 14B, 14C and 14D respectively of Fig. 1. Thus, the tanks 1' and 9' being similar, terminal 14C' is located in the part of tank 9' that is similar to the part of tank 1' in which vent A' is located, terminal 14A' which controls vent A' being in the part of tank 9' that is diagonally opposite the part of tank 9' that is similar to the part of tank 1' in which vent A' is located. Similarly, terminal 14B' is in the part of tank 9' that is diagonally opposite the part of tank 9' that is similar to the part of tank 1' in which vent B' is located, and so on.

With the tanks in the position shown in Fig. 2, terminals 14C' and 14D' are at the potential of the ungrounded side of the source 13', and thus solenoids 7C' and 7D' are energized, and valves 5C' and 5D' are open, providing venting for the tank 1' above the fuel 2'. If, due to manoeuvring of the aircraft in which the tanks are mounted, the tanks should rotate clockwise from the position shown, the mercury 10' runs out of contact with terminal 14D' and into contact with terminal 14B', causing valve 5D' to close and valve 5B' to open. Venting above the fuel 2' is therefore always provided. Fuel is not permitted to flow out of submerged vents, and the system therefore overcomes the difficulty encountered in some aircraft where fuel spews out of the fuel tank vents in a long trail behind the aircraft when the aircraft rolls into an inverted position. The venting arrangement is particularly useful in engine oil sumps where venting is essential at all times.

Should the voltage source 13' fail, valves 5A', 5B', 5C' and 5D' close, preventing fuel from running out any of the pipes A', B', C' or D' as the aircraft manoeuvers, but solenoid 7X' (permanently connected by a wire 15', the wall 11' and the wire 12' to the source 13') is de-energized, permitting valve 5X' to open so that pipe X' acts as a safety vent.

In Fig. 2 only one fuel outlet 16 has been shown, to avoid confusion, but obviously the outlet 16 may desirably be replaced with a fuel withdrawal system such as is shown in Fig. 1.

It will be understood that the forms of the invention herein shown and described are to be taken as preferred examples of the same and that various changes in the shape, size and arrangement of the parts may be resorted to without departing from the spirit of the invention or the scope of the subjoined claims.

What we claim as our invention is:

1. In combination, a first tank containing liquid and having a plurality of outlets at different locations in the tank, valves controlling the outlets, each valve having an outlet opening position and an outlet closing position, a second tank similar to and in fixed relationship to the first tank, a plurality of electrical terminals in the second tank and insulated therefrom, the terminals corresponding in position to the outlets in the first tank, an electrically conductive liquid partially filling the second tank the conductive liquid contacting different terminals at different positions of the second tank, means imparting an electrical potential to the conductive liquid whereby a terminal contacted by the conductive liquid assumes the potential of the conductive liquid, and a control for each valve, each valve control including an electrical device, different ones of the electrical devices being connected to different ones of the terminals, each valve control being operable to change the position of its valve when the terminal to which its electrical device is connected assumes said potential.

2. In combination, a first tank containing liquid and having a plurality of outlets at different locations in the tank, valves controlling the outlets, each valve having an outlet opening position and an outlet closing position, a second tank in fixed relationship to the first tank and of similar shape to the first tank, a plurality of electrical terminals in the second tank and insulated therefrom, each terminal being at a similar location in the second tank to the location of one of the outlets of the first tank, an electrically conductive liquid partially filling the second tank, the conductive liquid contacting different terminals at different positions of the second tank, means imparting an electrical potential to the conductive liquid whereby a terminal contacted by the conductive liquid assumes the potential of the conductive liquid, and a control for each valve, each valve control including an electrical device connected to the terminal the location of which is similar to the location of the outlet controlled by the valve, the valve control being operable to change the position of its valve when the terminal to which its electrical device is connected assumes said potential.

3. In combination, a first tank containing liquid and having a plurality of outlets at different locations in the tank, valves normally closing the outlets, a second tank similar in shape to the first tank and in fixed relationship to the first tank, a plurality of electrical terminals in the second tank and insulated therefrom, the terminals corresponding in position to the outlets in the first tank, an electrically conductive liquid partially filling the second tank, the conductive liquid contacting different terminals at different positions of the second tank, means imparting an electrical potential to the conductive liquid whereby a terminal contacted by the conductive liquid assumes the potential of the conductive liquid, and a control for each valve, each valve control including an electrical device, different ones of the electrical devices being connected to different ones of the terminals, each valve control being operable to open its valve when the terminal to which its electrical device is connected assumes said potential.

4. The combination claimed in claim 3, in which the means imparting an electrical potential to the conductive liquid comprises an electrically conductive wall of the second tank and a voltage source one side of which is connected to the wall.

5. The combination claimed in claim 4, in which the electrical device is a solenoid connected to the other side of the voltage source and energized from the voltage source when the terminal to which it is connected is contacted by the conductive liquid.

6. In combination, a first tank containing liquid and having an outlet, a voltage source, a valve controlling the outlet, a solenoid connected to and energized from the voltage source and holding the valve closed, the valve opening upon de-energization of the solenoid thus permitting withdrawal of the liquid from the tank through the outlet, the tank having a plurality of additional outlets at different locations in the tank for withdrawal of the liquid from one or more of the additional outlets at different positions of the tank relative to the earth, additional valves normally closing the additional outlets, a second tank in fixed relationship to the first tank, a plurality of electrical terminals in the second tank and insulated therefrom, each terminal being at a location in the second tank similar to the location of one of the additional outlets of the first tank, an electrically conductive liquid partially filling the second tank, the conductive liquid contacting different terminals at different positions of the second tank, means connecting the conductive liquid to one side of the voltage source, a solenoid energizable to open each of the additional valves, each solenoid being connected to the other side of the voltage source and to the terminal the location of which is similar to the location of the outlet normally closed by the valve which is operable by the solenoid, the solenoid being energized when the terminal to which it is connected is contacted by the conductive liquid.

7. The combination claimed in claim 6, in which the tank has an outlet manifold, the outlets comprise pipes leading to the manifold, and the valves are located adjacent one another at the manifold.

References Cited in the file of this patent

UNITED STATES PATENTS 863,735   Maclean _____ Aug. 20, 1907

FOREIGN PATENTS 25,926   Great Britain _____ of 1908